July 16, 1929.   M. OKOCHI   1,721,033
APPARATUS FOR COLLECTING VOLATILE SUBSTANCES
Filed Sept. 3, 1926
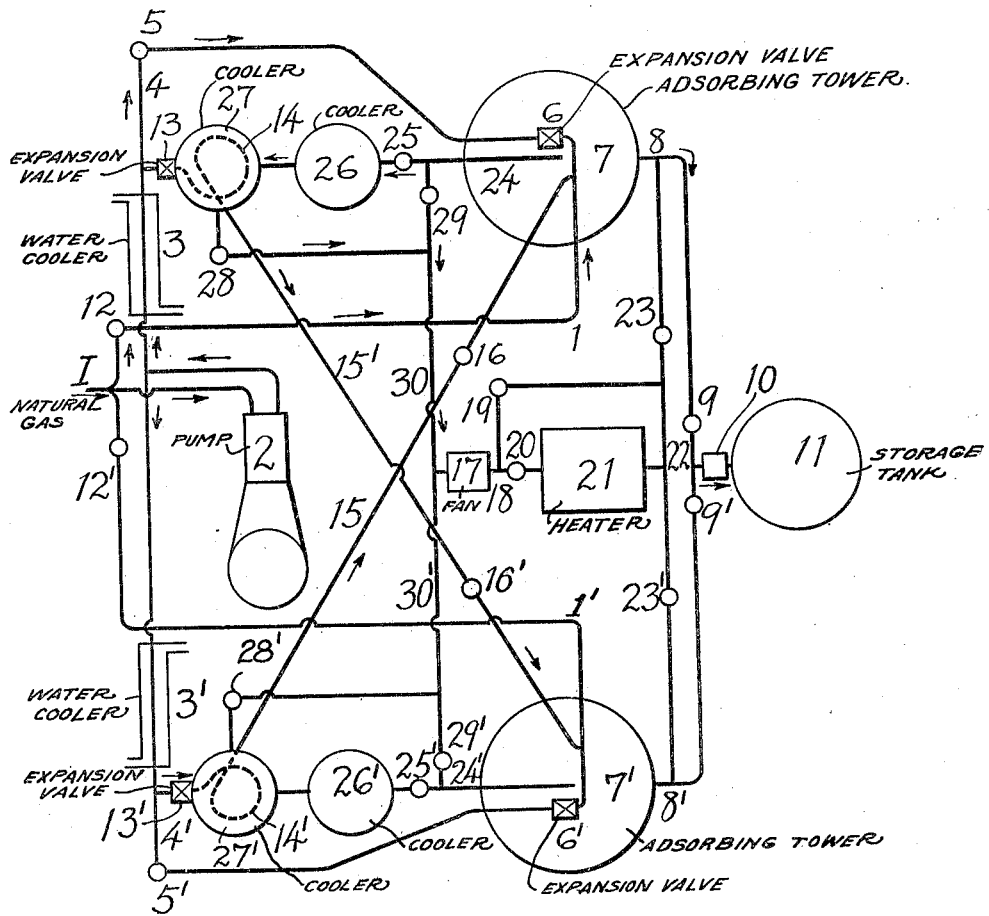
Inventor
M. Okochi
By Attorneys: Marks & Clerk Patented July 16, 1929.

1,721,033

UNITED STATES PATENT OFFICE.

MASATOSI OKOCHI, OF TOKYO, JAPAN.

APPARATUS FOR COLLECTING VOLATILE SUBSTANCES.

Application filed September 3, 1926, Serial No. 133,495, and in Japan June 19, 1926.

This invention relates to an improvement in apparatus for collecting volatile substances such as gasoline, benzene or other hydrocarbon oils contained in natural gas, coal gas, water gas, air or other gaseous substances wherein means are provided to pass the gaseous substance through absorbing material or materials such as adsole made from acidic earth, silica gel, charcoal or absorbing oils and the like. The object of the invention is to devise apparatus to carry out the adsorbing operation at low temperature and under ordinary or higher pressure so that volatile substances of lower boiling point and accordingly highly valuable oils can be easily and economically collected.

In the accompanying drawings,

Fig. 1 shows a diagrammatical arrangement of one type of apparatus suitable for carrying out the invention.

The invention may be fully explained with reference to the type of apparatus shown in Fig. 1.

a. Adsorbing step in one of the towers, say, in tower 7.

In this example the operations are performed alternately in two towers 7 and 7' and their accessories and the description is given in a case wherein vapours of volatile materials in, say, natural gas are collected. The gas coming from the main pipe I enters into a compressor 2. The compressed gas, after being cooled by a water cooler 3, and passing through a tube 4, a valve 5, reaches an expansion valve 6 through which it is led into the adsorbing tower 7 filled with adsorbing material so that the compressed gas is suddenly expanded and reaches a very low temperature in this tower 7. All the gasoline or other volatile materials including any water are adsorbed by adsorbing material in this tower and the perfectly dried gases such as methane go out therefrom through a pipe 8, a valve 9, a fan 10 and enter a tank 11 to be stored therein for use as a fuel or other purposes. A part of the gas coming through the main pipe I and not passed into the compressor 2, passes through a valve 12, and pipe 1 to the expansion valve 6, and is finally supplied into the tower 7 by being mixed with said expanded gas of very low temperature entering therein through the expansion valve 6, so that the temperature of the gas passing through the tower 7 is adjusted as desired. Moreover, the tower 7 is supplied with a third gas supplied from a cooler 27' as hereinafter described. This third gas is a part of the gas compressed by the compressor 2, which is thereafter cooled down by a water cooler 3' and, after passing through an expansion valve 13' having a very low temperature enters into the coil 14' in the cooler 27' to cool it down. By this coil 14', the gas is supplied to the tower 7 through a pipe 15 and a valve 16.

The above will be summed up in the following table for the sake of clearness.

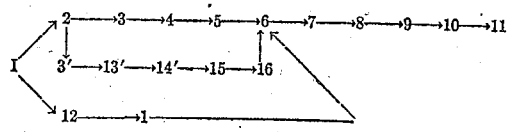

The character feature of the above step is to supply the gas under low temperature into the tower and the chief object of using the compressor is to use it as a means of obtaining a low temperature gas just as in an ordinary refrigerating apparatus. The compressor, however, also serves to cool or condense the vapours of gasoline or other volatile substances as hereinafter explained. When the content of volatile substances including water in the gas is great, a part thereof will be condensed before the gas reaches the tower, as the gas is highly compressed and cooled, and therefore, it is preferable that a trap or traps for volatile substances and water be provided in the passage of the compressed gas. The best position in which to provide such trap or traps may be the bottom of the coolers 27 or 27' and thereby choking of the expansion valve 6 by freezing of the volatile substances can be avoided.

b. Step of driving off gasoline and other volatile substances from the tower 7.

When the tower 7 is saturated with the volatile substances, it is heated to drive them off. In the example shown, the valves 5, 9, 12 and 16 are closed and a fan 17 is started. The gas enters into a heater 21 through a tube 18 and a valve 20. The hot gas enters therefrom into the tower 7 through a tube 22, a valve 23 and the tube 8, so that the adsorbing material in the tower 7 is heated. Then the gas comes out through a tube 24, having two branches, through one of which the gas enters into a water cooler 26 through a valve 25, a low temperature cooler 27, a valve 28, a tube 30 and comes back to the fan 17. Through the other branch the gas directly comes back to the fan after passing a valve 29 and a tube 30. The above courses are repeated for a certain length of time and if a rapid heating is desired the valve 28 is slightly opened and the valve 29 is fully opened. In the other side, the coil 14 in the low temperature cooler 27 communicates with another adsorbing tower 7'. This tower 7' is now subjected to the adsorbing step. A part of the gas compressed in the compressor 2 is cooled in the cooler 3 and then it is expanded in the coil 14 by an expansion valve 13 so that it attains a very low temperature to sufficiently cool down the low temperature cooler 27. After cooling the cooler 27, the gas enters into the tower 7' through a tube 15' and a valve 16' and thereby any content of volatile substances are adsorbed by the adsorbing material in the tower 7'. Accordingly, in gas in the coil 14 there takes place a violent evaporation of gasoline or other volatile substances which in turn causes the self cooling of the gas. That is, gas in the coil 14 is not only cooled down by means of the expansion valve 13, but also is cooled by evaporation of volatile substances due to adsorption occurring in the tower 7', and thereby it is cooled to a remarkable low temperature. Therefore any hydrocarbons of even very low boiling points, which were driven off from the tower 7 and contained in said cycle of heated gas, can be wholly condensed when the gas passes through the cooler 27.

The above may be summed up as follows:

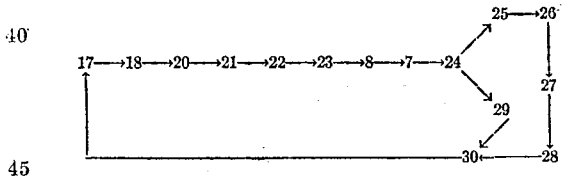

c. Step of cooling the tower 7 and thereby recovering the adsorbing power thereof.

Although this step is by no means an essential step of the invention, one example thereof may be explained as follows. That is, if it is desirous to artificially or rapidly cool the tower 7 for the preparation of next adsorbing step, it is sufficient to continue circulation of gas described in the preceding or the second step, but excepting the heater 21. For this purpose, the valves 20 and 29 are closed and the valves 19 and 23 are opened so that gas flows from the fan 17, to valves 19, 23, the tube 8, the tower 7, and therefrom to the tube 24, the water cooler 26, the low temperature cooler 27 in which it is cooled down to a very low temperature and returns to the fan 17 through the valve 28 and the pipe 30. When this cold gas circulates and goes into the tower 7, it is efficiently cooled. In this case a further amount of gasoline etc. is condensed in the coolers 26 and 27. The above step may be summed up as follows:

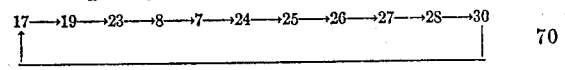

Here the tower 7 is now ready for the second adsorbing step.

The above described three operations or steps are successively and alternately carried out also in the tower 7' and therefore with reference to this tower 7', the steps are as follows:

a'. Adsorbing step in the tower 7'.

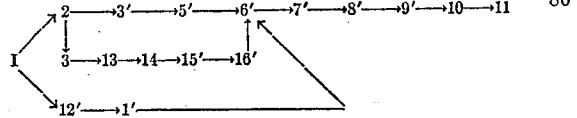

b'. Step of driving off volatile substances from the tower 7'.

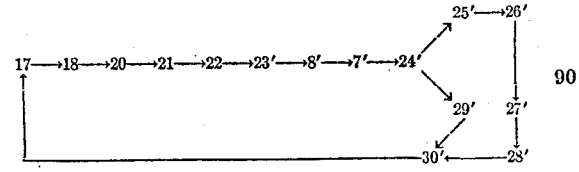

c'. Step of cooling the tower 7'.

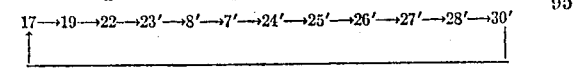

In these operations, when it is desired to carry out the adsorption under pressure, the valves 9 and 9' are partly opened and compressors, the exerting pressure of which is lower than that of the main compressor 2, are provided in the pipes 1 and 1'. Thus, when the tower is subjected to an adsorption under low temperature and high pressure; almost all of the volatile substances of very low boiling points can be collected which otherwise or under ordinary temperature and pressure can by no means be collected.

For the so-called adsorbing substances, any one having adsorbing properties may be used. For instances, silica gel, carbonaceous substances such as charcoal or any others of similar property can be employed. But the inventor recommends the so called adsole which is made of acidic clay such as Japanese acid earth, Florida earth or fuller's earth and has a proper form affording a great adsorbing area, and prepared by a process described in U. S. application Ser. No. 683,070.

Although the invention is explained referring more particularly to the collection of volatile substances contained in natural gas, the scope of the invention is of course not limited to such special application. Thus the invention can be well applied to collect volatile substances in any of so-called permanent gases. For instance, benzene, naphthaline in coal gas can be collected with good result according to the invention, so that it may be broadly employed in gas industry in broad sense.

Claim:

Apparatus for recovering volatile condensable vapors or gases from gaseous mixtures containing the same comprising a plurality of adsorption towers adapted to contain solid adsorbents each tower being provided with an expansion valve connected thereto, a compressor connected to said expansion valves to compress gases to be treated, coolers connected to said towers to condense volatile material coming therefrom, expansion valves connected to said coolers, a pipe for supplying uncompressed gas to the towers and pipes connecting the pressure side of the compressor with the expansion valves of the coolers whereby cold compressed gas is made to cool down the coolers prior to passage of the gas to the adsorption towers.

In testimony whereof I affix my signature.

MASATOSI OKOCHI.